Jan. 6, 1970     J. R. DUKES     3,488,502
NONSHIFTING RADIATION SOURCE CAPSULE
Filed June 2, 1966
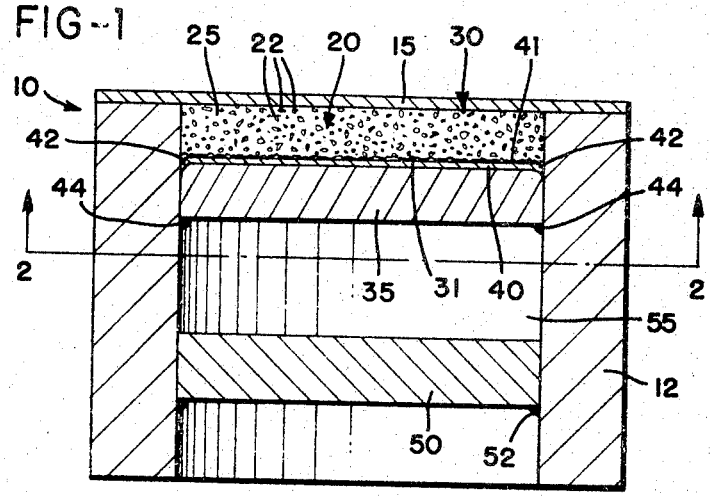
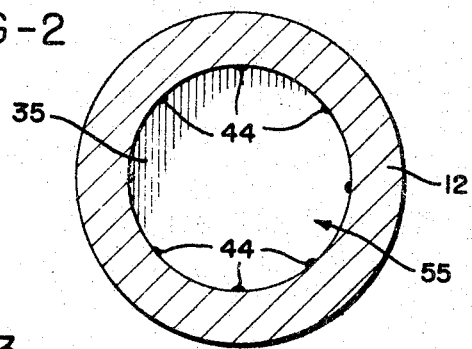
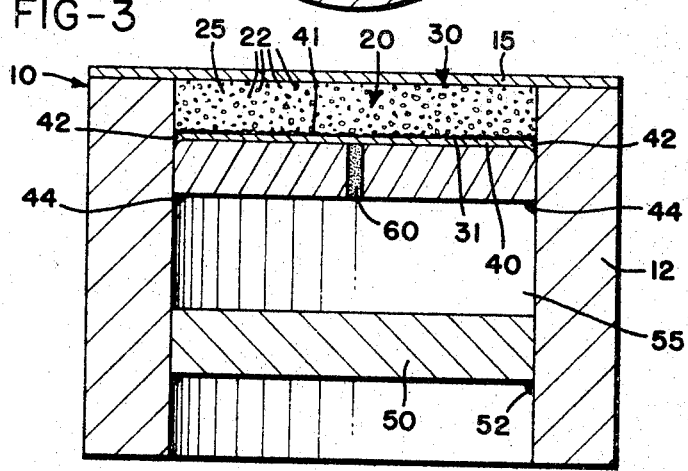
INVENTOR
JOHN R. DUKES
BY
ATTORNEYS

United States Patent Office 3,488,502
Patented Jan. 6, 1970

3,488,502
NONSHIFTING RADIATION SOURCE CAPSULE
John R. Dukes, Worthington, Ohio, assignor to Industrial Nucleonics Corporation, a corporation of Ohio
Filed June 2, 1966, Ser. No. 554,750
Int. Cl. G21h 5/00
U.S. Cl. 250—106                                    11 Claims

ABSTRACT OF THE DISCLOSURE

A substantially immobile "nonshifting" relatively high energy radiation source includes a particulate radioisotope bearing material positioned within a chamber formed in a capsule. Movement of the radioactive isotope element or any attenuating mass is prevented by a deformable conformational barrier member which is nonporous relative to the particulate material and which prevents any attenuating producing movement of any particulate material within the capsule. In the case of gas producing radioisotopes, provision is made to permit escape of gas while preventing movement of attenuating masses or radioactive isotope material. Various radioisotopes and barrier members are described as well as various ways to assemble a "nonshifting" source.

---

This invention relates to radiation source capsules, and more particularly to an improved source capsule which substantially eliminates changes in the emitted radiation due to shifting of the emitting material or because of movement of an attenuating material into a position within the capsule where it reduces the radiation emanating from the source capsule.

With an increased use of noncontacting measuring devices employing a radioactive source capsule, for example, radiation thickness gauges and the like, there has been an increased demand for increasing accuracy of the system which includes the source, the detector and the associated electronic and control equipment. By "radioactive source" is meant a radioactive isotope bearing material which emits radiation caused by the decay of the isotope. The radiation may be alpha, beta, gamma or neutron radiation, or combiantions thereof, and of varying energies. "Capsule" as used in this description means supporting shell which may or may not be received in a support housing.

Radiation source capsules generally include a radioactive isotope bearing material supported within a shell, the shell including a relatively thin window through which the radiation passes. In some instances, materials are present in the source capsule which are frangible under conditions of vibration, pressure, or shock, or are adversely affected by the radiation emitted from the source, for example, organic materials, glass, silicates, carbon, and porous materials. While the presence of these material may not adversely affect the operation of the source capsule in some applications, there are circumstances under which small changes or shifts of the mass within the capsule may result in changes in attenuation within the capsule of the radiation emitted from the isotope resulting in what may be described as a "shifting source," that is, a source whose transmitted radiation varies sufficiently to produce an erroneous indication of the variable being measured by the particular system, e.g., thickness, velocity, etc. The variation in transmitted radiation is different in its cause from the normally anticipated variations, for example, accumulation of dirt etc. (between the source and detector), and predictable gradual changes in emitted radiation due to natural decay of the radioisotope, each of which can be compensated for by any of several well known standardization procedures.

The conditions which give rise to a shifting source vary somewhat, for example, the source capsule in many cases is operated in an environment in which there is vibration and the like which may cause fracture of components within the capsule, particularly of porous or ceramic or other frangible materials. Also, the materials within the capsule may oxidize due to air and/or moisture which is sealed in the capsule, and the oxidation products may flake and may move into a position where they act as attenuators of radiation, or if the products are radioactive the radiation they emit is attenuated differently.

In some instances, the radioactive isotope is of a type which results in the formation of a gas during radioactive decay, and accumulation of the gas within the capsule may cause movement or displacement of an attenuating mass in the radiation path, for example, the capsule window. In other cases, the radioisotope itself is particulate in form, and the particles thereof may change their relative position by what ordinarily would be considered a small amount but which produces a noticeable change in radiating emanating from the capsule. Various radioisotopes have a high Z (atomic number) and thus exhibit relatively high self-attenuation. The physical displacement of a high Z radioisotope particle brings about a change in transmitted radiation, but if the displacement brings the particle in the radiation path of another particle, the first also acts as an attenuator for the radiation emitted from the other particle.

The presence of plastics in the capsule which are exposed to radiation results in crazing or cracking thereof over a period of time, while in other instances the presence of frangible materials such as carbon, glass or ceramic frits and silicates may result in the formation of small pieces as a result of vibration of the capsule or mechanical shock to the capsule. The size of such fragments, even though considered small under the usual circumstances, constitute movement of an attenuating mass which absorbs radiation within the capsule thereby changing the amount of radiation emitted from the capsule.

The changes in gamma radiation emanating from the capsule are particularly noticable with those of relatively low energy, for example, the radioisotope americium-241. This particular isoptope has a half life of approximately 462 years, and emits alpha radiation, in addition to gamma rays with an energy of 59.6 kev., and other gammas of lesser significance. Americium (Am) exists in various valence states and thus several different oxides are possible, although the dioxide (Am-241 $O_2$) is frequently referred to, this material may be a mixture of two or more oxides. Thus, when the terms "Americium-241 oxide" or "Am-241 O" are used, these terms are intended to cover the dioxide, and the other oxides, and mixtures thereof. While Am metal exists, it oxidizes easily to the oxide which is a powdery material, and in fact the Am-241 O currently available is a particulate powdery material. Am-241 O is an alpha emitter. The alpha particle consists of two protons and two neutrons which is identical to the nucleus of a helium atom. By definition, one curie of activity produces $3.7 \times 10^{10}$ atoms disintegrating per second, and in the case of Am-241 O this results in the formation of approximately the same number of helium atoms per second per curie of activity. The formed helium nucleons may easily pick up free electrons within the capsule to form helium gas. Am-241 O offers certain advantages as a gamma emitting radioisotope because of the energy level of the emitted gamma and the relatively long half life. The 59.6 kev. gamma emitted from Am-241 O is of an energy level which renders it desirable for use in many commercial non-contacting and non-destructive measuring systems, for example, thickness gauges and the like. The fact that a gas is formed as a result of the radioactive decay, and the current availability of the isotope as a particulate Am-241 O powder creates some problems in providing an immobile non-shifting source. The fact that Am has a high atomic or Z number, i.e. 95, thus places it in the category of a high self-attenuator, a characteristic which tends to aggravate the problem of a shifting source.

Accordingly, it is a primary object of the present invention to provide a radiation source capsule wherein changes in attenuation of emitted radiation due to source shifting is substantially eliminated.

Another object of the present invention is to provide a radiation source capsule wherein the radioisotope bearing material within the capsule includes a particulate solid radioisotope which results in the formation of gas during its decay, the radioisotope bearing material being maintained in a confined condition to prevent changes in attenuation of radiation within the capsule by substantially eliminating shifts or movement of attenuating mass or radioisotope particles within the capsule while at the same time permitting passage of gas to a gas collection zone or reservoir within the capsule.

Another object of the present invention is the provision of a radiation source capsule which includes a substantially immobile non-shifting radiation source material therein.

A further object of the present invention is to provide a radiation source capsule utilizing americium-241 oxide in particulate form as the radioisotope, and wherein attenuating masses and radioisotope particles are maintained substantially immobile within the capsule while permitting passage of the gas formed by the decay of the radioisotope into a gas reservoir within the capsule.

Radiation source capsules broadly include a supporting shell having therein a radioisotope bearing material. The shell includes a radiation transmitting window positioned to receive radiation from the radioisotope bearing material thereby permitting passage of radiation out of the shell. Positioned within the shell and on the side of the radioisotope bearing material opposite the window is a backer member. The objects above described of the present invention are achieved by positioning a conformable non-porous barrier member between the backer and the radioisotope bearing material so that it substantially completely fills the space between the radioisotope bearing material and the backer member. Preferably, the barrier is a relatively thin ductile sheet having edges which are in wiping contact wth the shell permitting passage of any gas formed in the radioisotope bearing material toward the backer. The surface of the barrier facing the radioisotope bearing material is maintained in conformational engagement therewith by the backer. Positioned within the shell and spaced from the surface of the backer opposite the barrier is a sealing plug which is sealed to the shell. The space provided between the barrier and the plug forms a gas reservoir into which any formed gases may pass.

Other objects and advantages of the invention will be apparent from the following description, the accompanying drawing and the appended claims.

In the drawing:

FIG. 1 is an enlarged sectional view of a radiation source capsule in accordance with the present invention;

FIG. 2 is a view along the line 2—2 of FIG. 1 but in reduced dimension showing the back face of the backer; and FIG. 3 is a sectional view of another embodiment of a radiation source capsule in accordance with the present invention.

Referring to FIG. 1 of the drawing, the source capsule 10 includes a supporting shell 12 preferably of a metal having high strength characteristics and being corrosion resistant, for example, stainless steel. In the form shown, the shell 12 is annular in shape, but other shapes may be used if desired. The shell 12 includes a radiation transmitting window 15 which is relatively thin to reduce attenuation of radiation emitted from a radioisotope bearing material generally indicated as 20 positioned within the shell. The window 15 is preferably of stainless steel secured to the shell 12 as by welding or brazing and the like, although it may be integral with the shell, if desired.

The radioisotope bearing material may include, for example, cesium-137, or cobalt-60, both considered high energy gamma emitters; or beta emitters such as strontium-90, yttrium-90, thallium-204, ruthenium-106, carbon-14 or promethium-147; or alpha emitters such as americium-241, polonium-210, or radium-226. In the event a neutron source is desired, any alpha emitter may be used, in combination with a target material of high neutron yield. While a shifting source is not generally as much a problem with high energy materials as it is with low energy materials, there are certain instances in which the system accuracy requires a substantially immobile non-shifting relatively high energy radiation source within the capsule. A shifting source is, however, troublesome in the case of low energy gamma and beta sources, particularly in systems where the detector and the electronics have become sufficiently refined to be very sensitive to quite small changes in radiation emanating from the capsule for the reasons previously described.

For the purposes of illustrating the present invention, reference will be made to an Am-241 O source, which may be classified as a low energy gamma emitter, and which presents the problems of accommodating a gaseous product which results from the natural alpha decay and of exhibiting a high degree of self-attenuation. The radioisotope bearing material 20 preferably includes particulate radioactive isotope 22 and a bulking material 25, shown on a much enlarged scale for purposes of illustration and which are formed into a rigid matrix 30. It is desirable to use a bulking material since it makes it easier to get a more uniform distribution of the radioactive isotope in a wafer or layer of dimensions which are easier to handle. It is understood, however, that the matrix may be formed of powdered radioactive isotope without any bulking material, if desired, or it may be incorporated into ceramic beads or other binders. The bulking material may be a finely divided powder of metal or the like, for example, beryllium, carbon, aluminum, silicon, calcium, titanium, vanadium, chromium and the like proceeding progressively to materials of the high atomic number (Z) such as platinum and gold. In the case of Am-241, it is preferred to use a material having a relatively low Z number in order to minimize attenuation of the gamma rays by the bulking material in the matrix of radiation emitted from the radioactive isotope. Simultaneously it is desirable to avoid very low Z materials that provide a high neutron flux from the alpha bombardment. Typical low Z materials are carbon, aluminum, magnesium, silicon, copper and nickel, for example.

Received within the shell 12 and spaced from the surface 31 of the matrix 30 opposite the window 15 is a backer member 35, also shown in FIG. 2. The space between the backer member 35 and the surface 31 of the matrix is substantially completely filled by a barrier member 40 which includes a face 41 opposed to the face 31 of the matrix and which is in conformational engagement therewith. By substantially filling the space between the backer and the matrix, the barrier confines the components of the matrix, and by providing a conformational barrier, all surface irregularities in surface 31 are substantially filled thereby substantially eliminating any movement of the components of the matrix. Also the barrier prevents components of the backer from moving into the matrix region and thus prevents introduction of any undesired attenuators therein. The barrier also keeps chemical reaction products by which may be formed at the barrier-backer interface from entering the matrix.

In one form the barrier may be a relatively thin disc of lead, for example, which may be poured or formed over the matrix after it has been formed in the shell as will be described hereinbelow. In a preferred form, the barrier 40 is in the form of a relatively thin ductile sheet or foil, for example, aluminum, stainless steel, gold, platinium, silver, lead, and the like. When a barrier member 40 in the form of a sheet or foil is used, it preferably includes edge portions 42 which extend around the outer periphery of the barrier and which are received in wiping engagement with the inner surface of the shell. The edge portions 42 of the barrier member 40 are in tight mechanical engagement with the matrix while at the same time permitting passage of any formed gas from the matrix region and between the edge portions 42 and the shell.

Backer member 35 may be any material with sufficient mechanical strength to hold the barrier in place, e.g. carbon, ceramic, aluminum, and steel. Some of these materials are frangible, under vibration and shock and the resulting particles could migrate into the matrix unless their movement is prevented. The backer member is preferably metallic, for example, stainless steel.

In the form shown in FIGS. 1 and 2, the backer member 35 is a solid plug retained in position within the shell by a series of spot welds 44, for example, and the dimensions of the backer 35 are so coordinated and correlated with the inner dimensions of the shell as to provide a slight interference fit therebetween which provides a relatively tight mechanical fit while at the same time permitting passage of gas around the periphery of the backer in the areas between the spot welds 44. This can be accomplished for example by scoring the peripheral walls before engagement.

Positioned within the shell 12 and spaced from surface 47 of the backer is a sealing plug 50 which is continuously sealed to the shell 12, for example, by a continuous weld or braze 52. The space 55 between the backer 35 and the sealing plug 50 forms a gas reservoir into which any gas formed as a result of radioactive decay or chemical decomposition may expand. Since the capsule is virtually completely and hermetically sealed by the sealing plug 50, shell 12 and window 15, the progressive build-up of gas is vented from the area of the matrix to minimize gas accumulation, and resultant pressure build-up which may cause flexing or movement of the window 15. Since the window is a radiation attenuator, any movement thereof, even though slight, could result in a change in attenuation which is manifest as a change in radiation emanating from the capsule. Such movement would also create void space in the region between window 15 and barrier 40 which could permit particulate matter in the matrix region to move or shift and cause a variation in the emitted radiation intensiy.

The radiation source capsule 10 may be fabricated as follows: The window 15 is assembled and fixed to the shell as by welding or brazing and thereafter a charge of particulate radioactive material is introduced into the shell. If desired, the charge may include a bulking agent, and the shell with the charge therein may be vibrated slightly to even the level of the charge. Thereafter, the barrier in the form of a sheet or foil may be placed into the shell and moved towards the charge. By using a foil having edges in wiping contact with the shell, substantially all of the particles of the charge are swept towards the window. Insertion of the foil may be accomplished by the use of a vacuum tool which holds the sheet until properly positioned, although it is understood that other assembly techniques may be used. With the barrier in contact with the charge, and with the window supported on a suitable surface, a compacting pressure is applied to confine the components of the charge between the barrier and the window and to form a relatively rigid matrix from the loose particles. The pressure may vary depending on the nature of the charge and the extent to which it is desired to compress the charge.

The compacting operation causes conformational engagement between the front face of the matrix and the opposed surface of the window as well as between surface 31 of the matrix and surface 41 of the barrier. If the backer 35 is used to apply the compressive force, there also tends to be some conformation between the facing surfaces of the barrier and backer which reduces the presence of small spaces and crevices into which particles may move. If not already in position, the backer is assembled and spot welded into place as indicated earlier. Thereafter, the sealing plug is assembled in position and sealed to the shell as previously indicated.

Referring to FIG. 3, another embodiment of the present invention is shown wherein like reference numerals have been applied where applicable. In this form, the backer 35 includes a low temperature seal 60 such as solder for excessive gas build-up and which is releasable at an elevated temperature. This design is useful where the matrix region has sufficient void space in the interstices of the particles to provide the needed gas reservoir at normal temperatures but not at elevated temperatures. In the form shown in FIG. 3, the welds 44 may be continuous so that gas passage occurs after rupture of the seal 60. The remaining components of the source may be described.

It is also possible in accordance with this invention to use a radioactive isotope in the form of a coated foil, for example Am-241 metal, or Am-241 coated on a suitable support. In either case, the Am-241 metal tends to oxidize within the capsule to form Am-241 O which in turn tends to powder. By providing a barrier and the gas reservoir as described, the isotope material is maintained confined and substantially immobile.

It is also possible in accordance with this invention to seal the backer to the shell as described in connection with FIG. 3, and to use small weep holes through the backer which permit passage of gas to the reservoir. The presence of weep holes in the backer does not adversely affect the confining action of the backer and barrier because the holes are sufficiently small to reduce the surface area of unsupported barrier surface to a minimum.

It is to be noted in FIG. 1 that the barrier is shown as being in substantial wiping contact with the shell, and the view has been exaggerated somewhat for the purpose of illustration. If the backer or compressing element is in close fitting engagement with the shell and includes squared corners, the extent of curvature of the barrier edge portions will be less than that shown, but the edge portions of the barrier will be in wiping, close fitting and gas passing relation. With a backer or compressing element having somewhat round corners, the extent of overlap will be somewhat like that shown. The significance, however, is in the relationship and function of the barrier, and this function may be performed by a poured lead barrier which will be in conformational engagement with the matrix surface to eliminate any spaces into which an attenuating mass may move. Another alternate to pouring is to place a suitable barrier material in position and raise the temperature of the assembly until the barrier softens or melts and comes into proper conformational engagement. This type barrier may be used under circumstances where the gas problem is not too severe, and particularly where the radioactive isotope is encased in a bead-type refractory matrix, shown in U.S. Patent 3,147,225 issued Sept. 1, 1964, for example. With a matrix of the type described in the above identified patent, a softened lead or other material offers the advantage of filling all the surface depressions which are in the surface facing the backer. Due to the relatively large size of some of the depressions, a softened material is better able to form a conformational barrier. To assure gas passage the inner walls of the shell may be scored with axial grooves of sufficient size to vent gas, but not large enough for particle movement therethrough.

While the form of apparatus herein described constitutes a preferred embodiment of the invention, it is to be understood that the invention is not limited to this precise form of apparatus, and that changes may be made therein without departing from the scope of the invention which is defined in the appended claims.

I claim:

1. In a radiation source capsule for use with gauges and the like, wherein said capsule includes a supporting shell and means forming a chamber within said shell for receiving a radioactive isotope, particulate radioisotope bearing material positioned within said chamber, said shell including radiation transmitting window means positioned to receive radiation from said particulate radioisotope bearing material and to permit passage thereof out of said shell, backer means positioned within said shell in adjacent spaced relation to said particulate radioisotope bearing material, the improvement comprising a deformable and conformable barrier means non-porous relative to said particulate radioisotope bearing material positioned within said shell between said backer means and said particulate radioisotope bearing material, and said barrier means being in direct contact with said radioisotope bearing material and substantially completely filling the space between said backer means and said material for confining said particulate radioisotope bearing material and for preventing passage of particulate material between said backer means and said particulate radioisotope bearing material.

2. A radiation source capsule as set forth in claim 1 wherein said barrier means is metallic foil means having edge portions in wiping contact with said shell.

3. A radiation source capsule as set forth in claim 1 further including sealing plug means positioned in said shell in spaced relation with said backer means, the space between said backer means and said sealing plug means forming a gas reservoir, and said backer means cooperating with said shell and said barrier to permit passage of gas between said radioisotope bearing material and said gas reservoir.

4. A radiation source capsule as set forth in claim 2 wherein said particulate radioisotope bearing material includes americium-241 isotope, and wherein said source is a gamma source.

5. A radiation source capsule as set forth in claim 2 wherein said radioisotope bearing material includes a radioisotope whose radioactive decay results in the formation of a gas, said edge portions of said foil means being maintained in engagement with said shell by said backer means while permitting passage of the formed gas therepast, means on the side of said foil means opposite said radioisotope forming a gas reservoir for reception of the gas, and said backer means being so constructed and arranged as to permit passage of gas from said radioisotope to said gas reservoir.

6. A radiation source capsule as set forth in claim 5 wherein said backer means is a solid plug maintaining said foil means in conformational engagement with the opposite surface of said radioisotope bearing material, sealing plug means positioned in said shell in spaced relation with said backer means, the space between said backer means and said sealing plug forming a gas reservoir, and said solid plug backer means cooperating with said shell to permit passage of gas from said radioisotope bearing material to said gas reservoir.

7. A radiation source capsule as set forth in claim 1 including gas reservoir means in said shell, said barrier means cooperating with said shell to permit passage of any gas produced by said radioisotope bearing material between said shell and said barrier means, and said backer means including means therein forming a gas passageway venting gas to said gas reservoir thereby preventing accumulation of gas pressure between said barrier means and said window.

8. A radiation source capsule as set forth in claim 7 wherein said radioisotope bearing material includes particulate material, said barrier means being in conformational engagement with the surface of said radioisotope bearing material opposite said window, and said barrier means being a foil member having edge portions in wiping contact with said shell.

9. A radiation source capsule as set forth in claim 7, where said backer includes means sealing said backer to said shell and wherein said means forming said gas passageway includes a low temperature seal, rupturable to permit gas passage to said reservoir at elevated temperatures.

10. A radiation source capsule as set forth in claim 1 wherein said radioisotope bearing material includes a particulate radioactive isotope and a particular bulking material and wherein said barrier means is in conformational engagement with the surface portion of said radioisotope bearing material opposite said window.

11. In a radiation source capsule for use with gauges and the like, wherein said capsule includes a supporting shell and means forming a chamber within said shell for receiving a radioactive isotope, particulate radioisotope bearing material positioned within said chamber, said shell including radiation transmitting window means positioned to receive radiation from said particulate radioisotope bearing material and to permit passage thereof out of said shell, backer means positioned within said shell in adjacent spaced relation to said particulate radioisotope bearing material, the improvement comprising deformable and conformable non-porous metallic foil barrier means having edge portions in wiping contact with said shell and positioned between said backer means and said particulate radioisotope bearing material, said particulate radioisotope material including a particulate refractory matrix the particles of which encase a radioactive isotope, and said metallic foil barrier means being in direct contact with said radioisotope bearing material and substantially completely filling the space between said backer means and said material for confining said particulate radioisotope bearing material and for preventing movement of particulate material within said chamber.

References Cited

UNITED STATES PATENTS 2,830,190 4/1958 Karp.
3,337,735 8/1967 Christianson et al.

ARCHIE R. BORCHELT, Primary Examiner

U.S. Cl. X.R.

250—84

UNITED STATES PATENT OFFICE
CERTIFICATE OF CORRECTION

Patent No. 3,488,502          Dated January 6, 1970

Inventor(s) John R. Dukes

It is certified that error appears in the above-identified patent and that said Letters Patent are hereby corrected as shown below:

Column 1, line 56, "material" should read ---materials---; column 1, line 68, "(between the source and the detector)," should read ---between the source and the detector,---.

Column 2, line 21, "radiating" should read ---radiation---.

Column 7, line 64, "opposite" should read ---opposed---.

Column 8, line 29, "particular" should read ---particulate---

SIGNED AND SEALED
FEB 9 1971

(SEAL)
Attest:

Edward M. Fletcher, Jr.
Attesting Officer

WILLIAM E. SCHUYLER, JR.
Commissioner of Patents